Jan. 8, 1929.
C. D. CLARK
1,698,620
NUTCRACKER
Filed Dec. 5, 1927
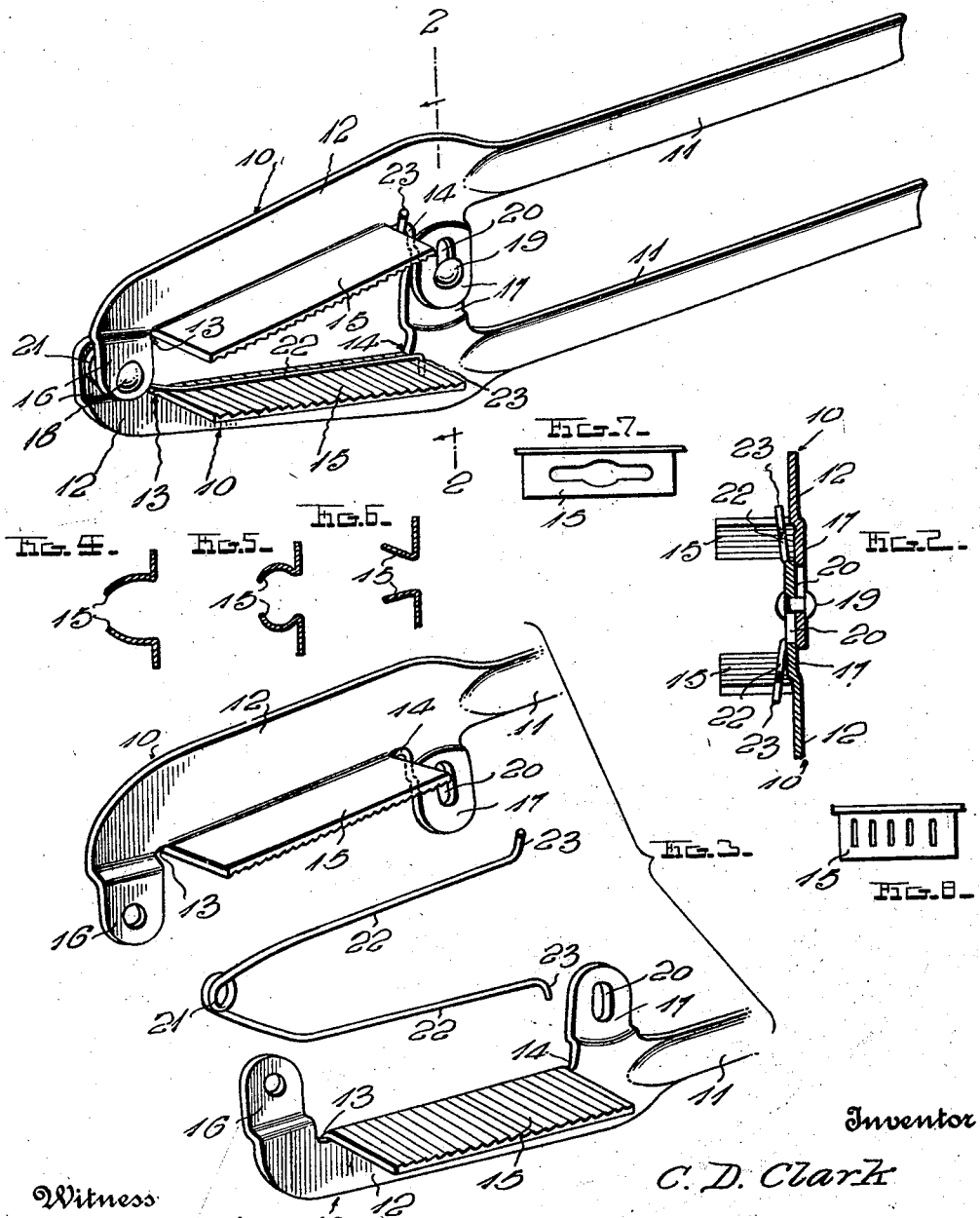
Inventor
C. D. Clark Patented Jan. 8, 1929.

1,698,620

UNITED STATES PATENT OFFICE.

CLAUDE D. CLARK, OF AKRON, OHIO.

NUTCRACKER.

Application filed December 5, 1927. Serial No. 237,911.

This invention aims to provide a new and improved form of nut cracker which may be easily and inexpensively manufactured and hence may be sold at a low price and which may be more easily and effectively used than any nut cracker now in use because it permits of the nut, of whatever size or shape, being placed with the thumb and index finger of either hand in such position between the jaws as will, by the usual compression of the lever handles, but without any adjustment or change in relative position of any part of the cracker preliminary to compression, allow the shell of the nut to be fractured without crushing the kernel or breaking it so as to make removal from the shell difficult, and while the device is intended primarily for cracking pecans, it is of course not restricted to such use.

With the foregoing in view, the invention resides in the novel subject matter hereinafter described and claimed, description being accomplished by reference to the accompanying drawing.

Fig. 1 is a perspective view of a nut cracker constructed in accordance with my invention.

Fig. 2 is a transverse sectional view on line 2—2 of Fig. 1.

Fig. 3 is a fragmentary disassembled perspective view.

Figs. 4, 5 and 6 are detail transverse sectional views showing different formations of jaws which may be used if desired.

Figs. 7 and 8 are fragmentary elevations showing that the jaws may be formed with openings of one shape or another if desired.

The preferred form of construction is herein disclosed and will be specifically described, with the understanding however that within the scope of the invention as claimed, minor variations may be made.

The numbers 10 on the drawings, denote two elongated, pressed metal members, each of which is provided with a relatively narrow rear or handle portion 11 and with a comparatively wide front portion 12. Each front portion is formed with a front transverse cut 13 and with a rear transverse cut 14, both of which open through the inner edge of said portion 12 and extend preferably of about half the width of the latter. The metal between the cuts 13—14 of each portion 12, is bent laterally to provide a jaw 15, which jaw may be of any desired configuration and provided with any appropriate means to prevent slippage of nuts, in which connection see Figs. 4, 5, 6, 7 and 8.

Lateral bending of the metal to form the jaw 15, provides each of the members 10 with a front lug 16 and with a rear lug 17, disposed respectively at the front and rear ends of the jaw. These lugs of the two members 10 are overlapped and are slightly offset laterally, the front lugs 16 being connected with each other by a rivet or other pivot 18, while the rear lugs 17 are slidably connected with each other to control the relative movement of the jaws 15, not only limiting the opening of said jaws, but preventing closing thereof beyond a predetermined extent, so that the nuts cannot be severely crushed after their shells have been cracked.

The sliding connection between the lugs 17, is preferably established by a rivet 19 passing loosely through slots 20 in said lugs. The jaws formed as already shown by lateral bending of the metal between the lugs 16—17 are so shaped at the angle when bent that the inner edges of the jaws form an opening which, when the jaws are in the open position, is wider at the rear end than at the front end.

The difference between the width of this opening at the front end and the width at the rear end when the jaws are open corresponds roughly to the difference between the diameter of the smallest size nuts and the diameter of the largest sized nuts for which this cracker is to be used—and the proper compression, or pressure upon the shell, of any nut of any diameter is made certain by placing it where it fits tightly between the jaws, the jaws being of such shape and so disposed laterally as to facilitate the proper placing of each nut.

The nut being so placed the compression to which it will be subjected is according to the distance which the jaws move toward each other at the point where the nut is placed. The movement of the jaws toward and away from each other is controlled by the rear lugs which are slidably connected and which limit by means of the loose rivet the opening and closing of the jaws to that predetermined width which allows the proper placing of the nut and insures the proper compression.

The jaws in normal position being held wide open by the spring and being offset or lateral to the lever handles and pivot, the thumb and finger holding the nut can be inserted between the jaws to place the nut, to hold it in position or change its position if necessary without danger of having the fingers pinched and with such ease that the nut can be placed, cracked and removed from the jaws without loosening the hold upon it with the thumb and finger. This permits of easy and speedy action as well as avoiding the usual waste because of crushed and broken kernels.

A spring, formed of wire, is coiled at 21 around the pivot 18 and is provided with rearwardly projecting arms 22 disposed at the inner longitudinal edges of the jaws 15, the rear ends of said arms being bent laterally across the rear ends of said jaws to assist in holding the spring arms properly in place. It is the function of these arms and the coil 21 to open the nut crackers after each nut-cracking operation has been performed.

Excellent results are obtainable from the exact details disclosed and they are therefore preferably followed. However, within the scope of the invention as claimed, variations may be made, as above stated.

I claim:

1. A nut cracker comprising two elongated members whose rear portions constitute handles, the front portions of said members being provided with laterally projecting jaws and with overlapping lugs at the front and rear ends of said jaws, a pivot connecting the front lugs, and a sliding connection between the rear lugs for controlling the relative movements of the jaws.

2. A structure as specified in claim 1; together with a spring coiled about said pivot and having rearwardly projecting arms, said arms being disposed at the inner edges of said jaws and having their rear ends directed across the rear ends of said jaws.

3. A nut cracker comprising two elongated pressed metal members each having a rear or handle portion, the front portion of each member having two transverse cuts near its front and rear ends respectively and opening through its inner edge, the metal between said cuts of the two members being bent laterally to provide jaws, leaving front and rear lugs at the ends of said jaws, a pivot connecting the front lugs of the two members together, and a sliding connection between the rear lugs to limit the relative movements of the jaws.

4. A structure as specified in claim 3; together with a spring coiled about said pivot and having rearwardly projecting arms, said arms being disposed at the inner edges of said jaws and having their rear ends directed across the rear ends of said jaws.

In testimony whereof I have hereunto affixed my signature.

CLAUDE D. CLARK.